US009321696B2

(12) United States Patent
Buet et al.

(10) Patent No.: US 9,321,696 B2
(45) Date of Patent: Apr. 26, 2016

(54) METHOD FOR ENHANCING THE MECHANICAL STRENGTH OF AN SIC/SIC CERAMIC MATRIX COMPOSITE MATERIAL (71) Applicants: Commissariat à l'énergie atomique et aux énergies alternatives, Paris (FR); Centre National de la Recherche Scientifique, Paris (FR)

(72) Inventors: Emilien Buet, Massy (FR); Cédric Sauder, Saint Arnoult en Yvelines (FR); Sylvie Poissonnet, Igny (FR); Cathie Vix-Guterl, Riedisheim (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 0 days.

(21) Appl. No.: 14/367,397

(22) PCT Filed: Dec. 21, 2012

(86) PCT No.: PCT/EP2012/076653
§ 371 (c)(1),
(2) Date: Jun. 20, 2014

(87) PCT Pub. No.: WO2013/093010
PCT Pub. Date: Jun. 27, 2013

(65) Prior Publication Data
US 2014/0346136 A1    Nov. 27, 2014

(30) Foreign Application Priority Data

Dec. 22, 2011 (FR) .................................... 11 62330

(51) Int. Cl.
B32B 37/00     (2006.01)
C03C 25/68     (2006.01)
(Continued)

(52) U.S. Cl.
CPC ........... *C04B 41/91* (2013.01); *C04B 35/62281* (2013.01); *C04B 35/62605* (2013.01);
(Continued)

(58) Field of Classification Search
CPC ...................................................... C04B 41/91
USPC ............................................................. 216/7
See application file for complete search history.

(56) References Cited

U.S. PATENT DOCUMENTS 5,071,679 A     12/1991  Heraud
6,375,752 B1 *   4/2002  Otsuki et al. ...................... 134/1
(Continued)

FOREIGN PATENT DOCUMENTS

FR    2 640 258 A1    6/1990
FR    2 939 789 A1    6/2010

OTHER PUBLICATIONS

C. Sauder et al., "Influence of Interface Characteristics on the Mechanical properties of Hi-Nicalon type-SA3 Tyranno-SA3 Fiber Reinforces SiC/SiC Minicomposites" International Journal of Applied Ceramic Technology, vol. 7, No. 3, 2010.
(Continued)

*Primary Examiner* — Roberts Culbert
(74) *Attorney, Agent, or Firm* — Pearne & Gordon LLP (57) ABSTRACT

The invention relates to a method for improving the mechanical strength of a ceramic matrix composite material of the SiC/SiC type, this composite material being obtained by (a) forming a fiber preform from 3$^{rd}$ generation silicon carbide fibers and (b) forming a ceramic matrix around the fiber preform, this ceramic matrix comprising silicon carbide. The method comprises a chemical etching treatment of the surface of the fibers by bringing said fibers into contact with a solution comprising an oxidizer, this treatment being carried out before step (a) or between steps (a) and (b).

10 Claims, 5 Drawing Sheets (51) Int. Cl.
 C04B 41/91 (2006.01)
 C04B 35/622 (2006.01)
 C04B 35/626 (2006.01)
 C04B 35/80 (2006.01)
 C04B 40/00 (2006.01)
 C04B 41/53 (2006.01)

(52) U.S. Cl.
 CPC ......... *C04B35/62645* (2013.01); *C04B 35/806* (2013.01); *C04B 40/0021* (2013.01); *C04B 41/5353* (2013.01); *C04B 2235/5244* (2013.01); *C04B 2235/721* (2013.01); *C04B 2235/75* (2013.01); *C04B 2235/963* (2013.01)

(56) References Cited

U.S. PATENT DOCUMENTS

| | | |
|---|---|---|
| 2012/0020863 A1 | 1/2012 | Plaisantin |
| 2013/0034655 A1 | 2/2013 | Lorrette |
| 2014/0084521 A1 | 3/2014 | Sauder |
| 2014/0153688 A1 | 6/2014 | Zabiego |

OTHER PUBLICATIONS

Cedric Sauder and Jacques Lamon, "The tensile creep behavior of SiC-based fibers with low oxygen content" Journal of the American Ceramic Society, 2007.

C. Sauder et al., "Innovative SiC/SiC Composite Materials for Fast Reactor Applications", ANS, 2010 Annual Meeting, Jun. 17, 2010.

E. Buet et al., "Influence of chemical and physical properties of the last generation of silicon carbide fibres on the mechanical behavior of SiC/SiC composite" Journal of the European Ceramic Society, vol. 32, Issue 3, Mar. 2012.

S. M. Dong et al, "Characterization of nearly stoichiometric SiC ceramic fibres" Journal of Materials Science, vol. 36, No. 10, 2001.

Written Opinion issued in Application No. PCT/EP2012/076653 dated Apr. 5, 2013.

Y. G. Gogotsi et al., "Formation of Carbon Coatings on SiC Fibers by Selectrive Etching in Halogens and Supercritical Water" Ceramic Engineering and Science Proceedings, American Ceramic Society Inc., vol. 19, No. 3 dated Jan. 20, 1998.

O. Greck et al., "SiC Ceramic Fibres: Evidence of a Carbon Network" Advances in Science and Technology, vol. 22, dated Jan. 1, 1999.

Y. G. Gogotsi et al., "Formation of carbon films on carbides under hydrothermal conditions" Nature: Inernational Weekly Journal of Science, Nature Publishing Group, United Kingdom, vol. 367, No. 6464, dated Feb. 17, 1994.

International Search Report issued in Application No. PCT/EP2012/076653 dated Apr. 5, 2013.

\* cited by examiner

METHOD FOR ENHANCING THE MECHANICAL STRENGTH OF AN SIC/SIC CERAMIC MATRIX COMPOSITE MATERIAL

TECHNICAL FIELD

The present invention relates to the field of ceramic matrix composite materials (CMC materials) of the SiC/SiC type.

More specifically, it relates to a method allowing improvement of mechanical strength of ceramic matrix composite materials (CMC materials) of the SiC/SiC type.

The method according to the invention has many applications and may in particular be used for making SiC/SiC composites intended for high temperature applications, such as for example the making of fuel claddings or hexagonal tubes for nuclear reactors, in the aeronautics (making of nozzles, turbine blades, flaps and hot parts of jet engines), for making heat exchangers, high temperature gas turbines, etc. . . . .

STATE OF THE PRIOR ART

Within the scope of the present invention, emphasis is laid on SiC/SiC composites, and in particular on SiC/SiC composites which are made from so-called $3^{rd}$ generation SiC fibers.

$3^{rd}$ generation SiC fibers are high purity fibers; indeed they contain very little oxygen and have a very small excess of free carbon (second phase). $3^{rd}$ generation SiC fibers are sometimes described as <<stoichiometric>> fibers. However, this term is misleading since $3^{rd}$ generation SiC fibers are actually never perfectly stoichiometric. Indeed all the silicon is bound to the carbon in the form of SiC, but there always exists an excess of carbon not bound to silicon: this is free carbon. The second phase mentioned above designates the carbon atom not bound to a silicon atom.

As an example, the ratio, in atomic percent, of the carbon atoms over the silicon atoms is 1.07 for Hi-Nicalon S fibers and 1.03 (at the surface) and 1.19 (in the fiber core) for Tyranno SA3 fibers (source: document [1]).

The use of $3^{rd}$ generation SiC fibers is of particular interest for making SiC/SiC composites intended for high temperature applications. Indeed the SiC/SiC composites made from $3^{rd}$ generation SiC fibers have a significant benefit in terms of high temperature mechanical robustness, in particular as compared with composites made from fibers of the previous generations ($1^{st}$ and $2^{nd}$ generation) (source: document [2]).

Moreover, the use of this type of fiber reinforcements of the $3^{rd}$ generation is even indispensable for making SiC/SiC composites which may be used within the scope of nuclear applications (source: document [3]).

However, at the present time, it is found that from among the three commercially available $3^{rd}$ generation SiC fibers, only two types of fibers are compatible in terms of composition with nuclear applications. These are the Hi-Nicalon S fibers (made by Nippon Carbon Co.) and the Tyranno SA3 fibers (made by UBE industry Ltd.).

The characteristics of both of these fibers are gathered in Table 1 below (source: document [1]).

TABLE 1

| DATA | Hi-Nicalon S | Tyranno SA3 |
|---|---|---|
| Density (g · cm$^{-1}$) | 2.95 | 3.01 |
| Number of fibers per thread | 500 | 1600 or 800 |
| Average diameter (μm) | 13 | 7 or 10 |
| Fiber modulus (GPa) | 375 | 385 |

TABLE 1-continued

| DATA | Hi-Nicalon S | Tyranno SA3 |
|---|---|---|
| Thread modulus (GPa) | 319 | 312 |
| Thread breakage stress (MPa) | 2480 | 2410 |
| Thread breakage deformation (%) | 0.73 | 0.68 |
| Heat conductivity at 25° C. (W · m$^{-1}$ · K$^{-1}$) | 18 | 65 |
| Grain size obtained by: | | |
| X ray diffraction | 20 | 60-70 |
| Transmission electron microscopy | 10-50 | 50-400 |
| C/Si chemical composition (atomic %) | 1.07 | 1.03 (surface) |
| | | 1.19 (core) |

As this may be seen, except for a heat conductivity difference and different grain size, both of these fibers have similar characteristics.

The chemical composition of the extreme surface is also itself similar for both fibers, i.e. the close surface mainly consists of carbon as shown in Table 2 below (source: document [4]).

TABLE 2

| Type of fiber | $C_{1s}$ (at. %) | $O_{1s}$ (at. %) | $Si_{2p}$ (at. %) |
|---|---|---|---|
| Hi Nicalon S | 83.9 | 5.6 | 10.6 |
| Tyranno SA3 | 84.3 | 4.1 | 11.6 |

By studying the time-dependent change in the chemical composition according to the depth of a Hi-Nicalon S fiber (FIG. 1a) and of a Tyranno SA3 fiber (FIG. 1b), it is seen that that the carbonaceous phase, a majority at the extreme surface, is present on about the first twenty nanometers of the fibers (from the surface to the core). It is recalled that an extreme surface corresponds to the first ten nanometers of a fiber (from the surface to the core).

Now, it is found that, although both of these fibers are relatively similar, the composite materials obtained from these two types of fibers have very different mechanical strengths. Indeed, while by making composites from Hi-Nicalon S reinforcements, it is possible to obtain materials having optimum mechanical behavior with high ductility, the making of Tyranno SA3 reinforcement composites, as for it, leads to a fragile material with low ductility.

Figure 2:
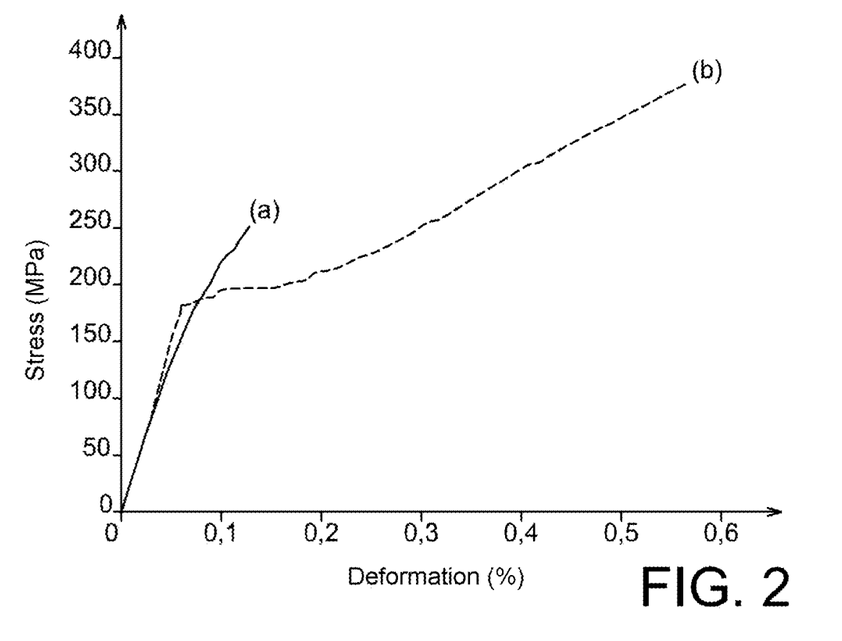
FIG. 2, already mentioned above, represents the mechanical tensile behavior of a 2.5D woven SiC/SiC composite of the plate type with Tyranno SA3 reinforcements, on the one hand (curve a), and with Hi-Nicalon S reinforcements, on the other hand (curve b).

For example, although deformations of more than 0.5% are conventionally obtained for SiC/SiC composites with Hi-Nicalon S reinforcements, SiC/SiC composites reinforced with Tyranno SA3 fibers never exhibit breakage deformations of more than 0.3%. This is illustrated in FIG. 2 which shows the tensile mechanical behavior of plates, the reinforcement of which results from 2.50 weaving performed with Tyranno SA3 fibers for one (curve a) and with Hi-Nicalon S fibers for the other one (curve b).

This is a penalty since the Tyranno SA3 fiber has interesting advantages relatively to the Hi-Nicalon S fiber.

Indeed, the Tyranno SA3 fiber has a lower manufacturing cost (about 7,500 €/kg) than that of the Hi-Nicalon S fiber (about 11,000 €/kg).

Furthermore, the Tyranno SA3 fiber has better resistance to oxidation at a high temperature (T>600° C.).

Finally, the Tyranno SA3 fiber has better heat conductivity than the Hi-Nicalon S fiber (65 versus 18 W/m/K) and this heat conductivity difference may be preponderant for a heat transfer application such as nuclear fuel cladding for example.

The inventors therefore sought to identify the origin of this difference in the mechanical strength between CMC materials with Tyranno SA3 fibers and CMC materials with Hi-Nicalon S fibers.

Thus during their investigations (document [4]), the inventors noticed that Tyranno SA3 fibers have surface roughness which is three times greater than that of Hi-Nicalon S fibers (12 nm versus 4 nm); on the other hand, they also noticed that the surface of the Tyranno SA3 fibers mainly consists of carbon and to a lesser extent, of SiC, with a negligible fraction of $SiO_2$, while the $SiO_2$ fraction is greater at the surface of the Hi-Nicalon S fibers, this difference in surface chemistry being related to different embodiments used during the making of both of these types of fibers.

The inventors inferred therefrom that the strength of the interface bond between the fibers and the matrix in a SiC/SiC material is controlled by the surface roughness and by the surface chemistry of SiC fibers. In the end, they reached the conclusion according to which the improvement in the mechanical strength of a composite material reinforced with Tyranno SA3 fibers should require a decrease in the surface roughness and/or a modification of the surface chemistry of the fibers.

However, if the surface chemistry of the fibers is modified, there is a risk of deteriorating the performances of these fibers; as for modifying the surface roughness of the fibers, although it is known how to increase the surface roughness of an SiC fiber, for example by proceeding with chemical etching of the Murakami type (mixture of 40 g of water, 6 g of soda and 8 g of potassium ferricyanide) (source: document [5]), it is not known how to proceed for reducing the surface roughness of an SiC fiber.

DISCUSSION OF THE INVENTION

The present invention precisely gives the possibility of reducing the surface roughness of $3^{rd}$ generation SiC fibers, preferably Tyranno SA3 fibers, and of thus managing to improve the mechanical strength of composite materials with SiC fibers.

For this purpose, the invention proposes improvements in the mechanical strength of a ceramic matrix composite material reinforced with $3^{rd}$ generation SiC fibers by applying to said fibers, before the formation of the composite material, a treatment with which it is possible to reduce the surface roughness of the fibers. By using the method according to invention, it is for example possible to obtain an SiC/SiC material from treated Tyranno SA3 fibers having a mechanical strength equivalent to that of a SiC/SiC material reinforced with non-treated Hi-Nicalon S fibers, the method according to the invention giving the possibility in this specific case of reducing the surface roughness of Tyranno SA3 fibers to a level similar to the one of Hi-Nicalon S fibers.

The important step of the manufacturing method according to the invention is based on chemical etching, by means of an agent oxidizing carbon, of the surface of the $3^{rd}$ generation SiC fibers intended to enter the composition of a composite material with a SiC/SiC ceramic matrix. Indeed, within the scope of their investigations, the inventors noticed surprisingly that by subjecting $3^{rd}$ generation SiC fibers to a chemical treatments by bringing these fibers in contact with a solution comprising an oxidizer, the surface roughness of these fibers managed to be reduced; the thereby treated fibers, when they are introduced into a SiC/SiC composite material, allow improvement in the mechanical strength of the thereby obtained SiC/SiC composite material. In fact, it would seem that the carbon oxidizing agent chemically etches a portion of the carbonaceous phase located on the extreme surface of the silicon carbide fibers.

The object of the invention is therefore a method for improving the mechanical strength of a ceramic matrix composite material of the SiC/SiC type, this material being obtained by (a) forming a fiber preform from $3^{rd}$ generation silicon carbide fibers and (b) forming a ceramic matrix around the fiber preform, said ceramic matrix comprising silicon carbide, which method comprises a chemical etching treatment at the surface of the fibers by bringing said fibers in contact with a solution comprising an oxidizer, this treatment being carried out before step (a) or between steps (a) and (b).

The fibers obtained at the end of the treatment step are less rough at the surface than untreated fibers. Thus, by using these treated fibers for making a SiC/SiC composite, the mechanical strength of the SiC/SiC composite is improved. In fact, an improvement in the mechanical strength of the SiC/SiC composite requires an increase in the breakage deformation of the composite.

Figure 1A:
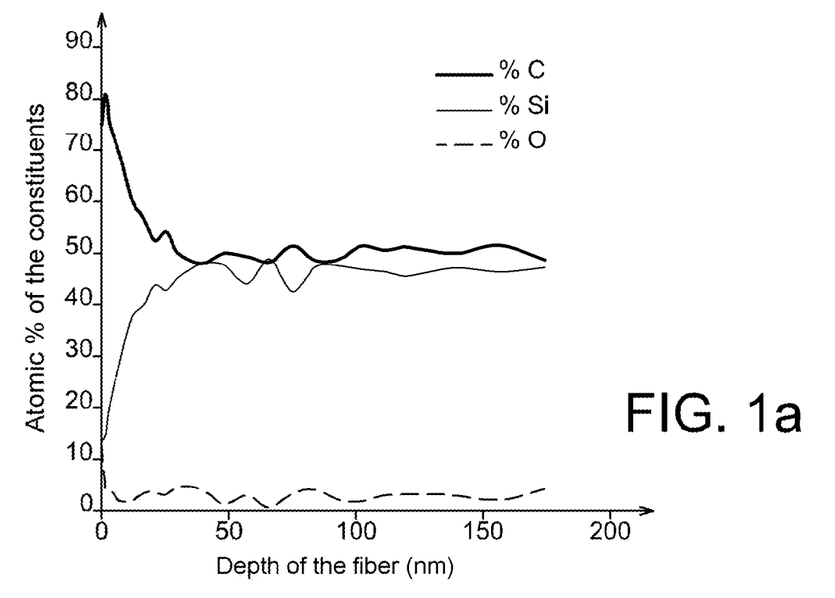
FIGS. 1a and 1b, already mentioned above, respectively illustrate the time-dependent change in the chemical composition according to the depth of a Hi-Nicalon S fiber (FIG. 1a) and a Tyranno SA3 fiber (FIG. 1b).
Figure 1B:
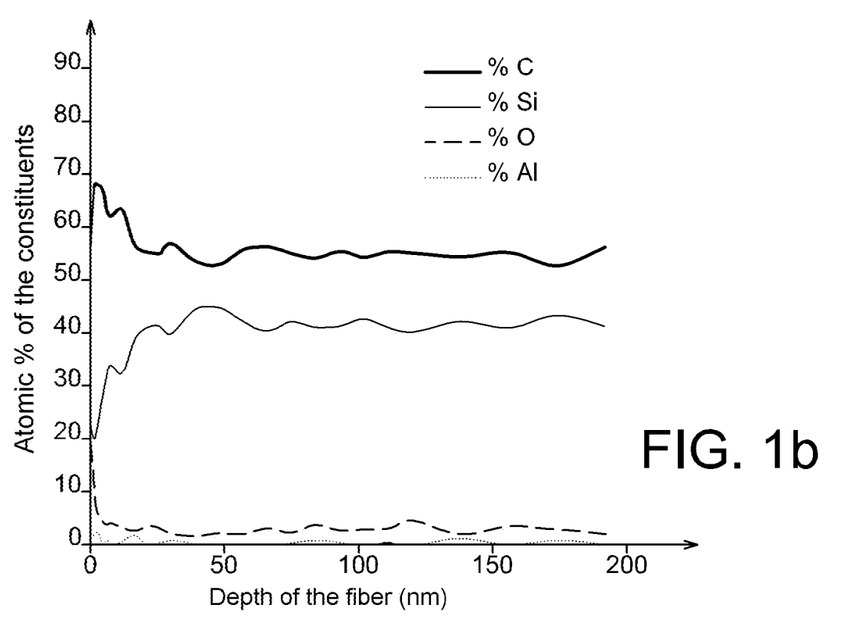

At the present time, the commercially available $3^{rd}$ generation SiC fibers include a larger carbon content at the surface than in the core of the fibers, like this is for example the case of Tyranno SA3 and Hi-Nicalon S fibers (see for example FIGS. 1a and 1b). Schematically, it may be considered that the fibers have a core and a peripheral area, the carbon content being greater in the peripheral area than in the core.

Preferably, the fibers before and after the chemical etching treatment include a carbon content which is greater at the periphery of the fibers than in the core of the fibers. To do this, chemical etching is stopped before it attains the core of the fibers in order not to remove the entirety of the carbon layer at the extreme surface of the fibers. Indeed, this carbon layer represents an asset for chemical adhesion between the fiber and the carbonaceous interphase during the formation of the SiC/SiC material (it is recalled that an SiC/SiC material is formed with a preform in $3^{rd}$ generation silicon carbide fibers, with a silicon carbide matrix and a carbonaceous interphase, located between the fibers and the matrix). Thus only a portion of the thickness of the peripheral area of the carbon-rich fibers is etched and finally the surface roughness of the fibers is reduced while preserving a carbonaceous phase in majority at the extreme surface of the fibers.

Finally, by means of the method according to the invention, it is possible to improve the mechanical behavior of a ceramic matrix composite made from fiber reinforcements having a close carbonaceous surface and a strong surface roughness, like for example the Tyranno SA-3 fibers.

In the present state of their investigations, the inventors assume that the chemical etching of the carbon present at the extreme surface of the fibers with a solution comprising an oxidizer would directly cause formation of carbon dioxide. More particularly, the bringing of the oxidizing chemical agent into contact with the carbon of the fibers would form a carbonaceous gas chemical species: carbon dioxide, carbon monoxide or other.

As a technique for forming a CMC material is well known to one skilled in the art, it is not described here. We shall simply recall that the formation of the fiber preform is generally obtained by entanglement of the fibers with each other (more specifically, this is intertwining of the threads with each other, one thread consisting of a set of fibers); as for the formation of the interphase and of the matrix, they are generally obtained by densification of the fiber preform by proceeding with chemical vapor deposition or infiltration (CVD or CVI).

As regards the intertwining of the threads for forming the fiber preform, this may be for example braiding, weaving or knitting of the threads with each other.

Preferably, the oxidizing treatment of the fibers is followed by one or several operations for washing the fibers (crude fibers or shaped into a fiber preform), and then by one or several operations for drying said fibers. These operations may be carried out according to the conventionally used procedures as regards washing and drying of fibers. For example, chemically treated fibers may be rinsed with distilled water and then with acetone for 15 minutes with the ultrasonic waves so as to be finally dried.

According to a preferred embodiment of the invention, the bringing of the fibers into contact with the solution is obtained by immersion of the fibers in the solution. When they are put into contact with a solution, the fibers may be crude or shaped (fiber preform).

Advantageously, the oxidizer which is used is selected from carbonates of an alkaline metal such as for example sodium or potassium, carbonates of an earth alkaline metal such as for example calcium or magnesium, peroxides, for example a hydrogen peroxide, hypochlorites of an alkaline metal, for example sodium or potassium, hypochlorites of an earth alkaline metal, for example calcium or magnesium, oxidizing acids, for example nitric acid $HNO_3$, chloric acid $HClO_3$, chromic acid $H_2CrO_4$, sulfuric acid $H_2SO_4$, and permanganates of an alkaline metal, for example sodium or potassium, or of an earth alkaline metal.

In fact, selection of the oxidizer is made from oxidizer capable of preferentially etching carbon.

Once the oxidizer is selected, the concentration of this oxidizer may be adapted according to time/volume/mass factors of the fibers to be treated. In any case, it is within the normal skills of a skilled practitioner of being able to determine, depending on the selected oxidizer, how to adapt the time/volume/mass factors of the fibers to be treated in order to obtain the desired surface roughness.

According to a preferred embodiment, the oxidizing solution is selected from a 15% by volume hydrogen peroxide ($H_2O_2$) solution, a sodium carbonate ($Na_2CO_3$) solution with a concentration of 1M and a 65% by volume nitric acid ($HNO_3$) solution.

Among all the treatments proposed above, a treatment on the basis of $Na_2CO_3$ is the most interesting from an industrial viewpoint, since it does not have any toxicity (it is even a food additive).

The use of a diluted $H_2O_2$ solution is also of interest, since it only has very small safety constraints related to its industrial use. Further it also has a low cost.

Preferably, the chemical etching treatment step further comprises the application of ultrasonic waves to the solution comprising an oxidizer, during the contacting of the fibers (crude fibers or fiber preform) with a solution. The application of ultrasonic waves will allow better diffusion of the oxidizer at the surface of the fibers and thus promotes homogenization of the chemical etching by oxidation of the surface of the fibers.

Preferably, the method further comprises desizing of the silicon carbide fibers before the chemical etching treatment, the desizing being carried out before step (a) or between steps (a) and (b). Indeed it is preferable, if the fibers have a sizing layer, to remove it before immersion of the fibers in the chemical solution. As a reminder, the sizing consists of a polymer layer being applied by the manufacturer on the fibers during the manufacturing of the threads in order to facilitate the shaping operations on the threads (weaving, braiding . . . ). However, the presence of this polymer may reduce or even cancel the efficiency of the chemical treatment, which justifies its preliminary removal.

Techniques for desizing fibers are known to one skilled in the art. To carry out this desizing, we may for example perform a heat treatment at about 900° C. under an inert atmosphere for one hour, in order to burn the sizing polymer, but any other treatment known to one skilled in the art having the effect of removing the sizing polymer may be applied (chemical treatment, flash heat treatment in air, etc. . . . ).

Advantageously, the silicon carbide fibers are fibers obtained by thermal decomposition and sintering of a Si—Al—C—O precursor. Preferably, the fibers are $3^{rd}$ generation silicon carbide fibers commercially available under the reference of Tyranno SA3. However it may be noted that any other SiC fiber having a carbonaceous layer at the surface may undergo the same treatment.

The invention will be better understood and other advantages and particularities will become apparent upon reading the description which follows, given as a non-limiting example, accompanied by the appended figures.

DETAILED DISCUSSION OF PARTICULAR EMBODIMENTS

In the examples below, we decided to work with Tyranno SA3 fibers having an average diameter of 10 µm and we treated them by immersion in a sodium carbonate ($Na_2CO_3$) solution with a concentration of 1M, a 15% by volume solution of hydrogen peroxide ($H_2O_2$) and a 65% by volume solution of nitric acid.

In each of the examples, each surface roughness was determined by atomic force microscopy (AFM) on four randomly sampled fibers in a batch of treated fibers.

On each of these four fibers, 25 images of 600 nm by 600 nm were produced in order to limit the uncertainty of the measurement.

In order to quantify the surface roughness for each treated fiber, we used the average of the standard deviations of the heights measured relatively to the average plane on the relevant surface ($R_{RMS}$). The $R_{RMS}$ is directly computed with the software controlling the AFM. Thus, the roughness values which are given here correspond to the values of the $R_{RMS}$.

EXAMPLE 1

In this exemplary embodiment, Tyranno SA3 SiC fibers are treated by using an oxidizing solution based on anhydrous sodium carbonate ($Na_2CO_3$) concentrated to 1M.

Once the oxidizing solution has been selected, the concentration of this oxidizing solution may be adapted according to time/volume/mass factors of fibers to be treated. In this example, the concentration and volume factors of the oxidizing solution with $Na_2CO_3$ were respectively set to 1M and to 4 ml.

The results of a treatment of the $Na_2CO_3$ (C=1M) type for one hour on Tyranno SA3 fibers having an average diameter of 10 μm are shown in Table 4 hereafter. In this table, the time dependent change in the surface roughness may be seen versus the mass of Tyranno SA3 fibers treated by means of an $Na_2CO_3$(C=1M) treatment for 1 h.

TABLE 4

| Mass of fibers (mg) | 2000 | 20 | 2 |
|---|---|---|---|
| R (mg/ml) | 500 | 5 | 0.5 |
| Surface roughness (nm) | 9.7 | 6.6 | 5.9 |

As a reminder, the initial roughness of a Tyranno SA3 fiber with an average diameter of 10 μm is 12 nm.

The $Na_2CO_3$ (C=1M) treatment on 2 mg of Tyranno SA3 fibers gives the possibility of obtaining a roughness of 5.9 nm, while a roughness of 9.7 nm is obtained on 2,000 mg of fibers.

These results show that the reduction in the amount of fibers in a same volume of oxidizing solution causes a reduction in the surface roughness of the fibers.

The mass of fibers/volume of oxidizing solution ratio (noted as R) is therefore a discriminating parameter for proper efficiency of the treatment.

Thus it is seen that for a treatment of the $Na_2CO_3$ (C=1M) type for one hour on Tyranno SA3 fibers, the efficiency of the treatment is optimum for a mass/volume ratio of 0.5 mg/ml.

In order to check whether this mass/volume ratio is a discriminating factor regardless of the amount of treated fibers, we also conducted a test for a 100 times greater mass of fiber by adapting the volume of oxidizing solution in order to keep this ratio constant while keeping a concentration (1M) and a constant treatment duration (1 h).

The results of the time-dependent change in the surface roughness according to the (mass of Tyranno SA3 fiber)/(volume of oxidizing solution) ratio for a $Na_2CO_3$ (C=1M) treatment for 1 h are gathered in Table 5 below.

TABLE 5

| Mass of fibers (mg) | 2 | 200 |
|---|---|---|
| Solution volume (ml) | 4 | 400 |
| R (mg/ml) | 0.5 | 0.5 |
| Surface roughness (nm) | 5.9 | 5.9 |

The results of Table 5 show that the mass of fibers may be adapted according to the volume of the oxidizing solution and vice versa.

The ratio R (mass of fiber/volume of oxidizing solution) is therefore discriminating for a constant treatment time.

In order to check the influence of the treatment temperature on the surface roughness of Tyranno SA3 fibers, we conducted an experiment at room temperature and at the boiling temperature of the $Na_2CO_3$ solution (1M) for a mass/volume ratio=0.5.

The time-dependent change and the surface roughness versus temperature of a $Na_2CO_3$ (C=1M) treatment for 1 h is noted in the Table 6 below.

TABLE 6

| Treatment temperature on 2 mg of fibers (° C.) | 25 | 100 |
|---|---|---|
| Surface roughness (nm) | 5.9 | 5.8 |

It is thus seen that the temperature of the treatment has no influence on the surface roughness of Tyranno SA3 fibers. The temperature is therefore not a discriminating factor for this solution.

The surface roughness of Tyranno SA3 fibers may be optimized by placing the system (solution and fibers) under ultrasonic waves.

The results of the time-dependent change of the surface roughness with or without application of ultrasound for 60 minutes on 20 mg of fibers for a $Na_2CO_3$ (C=1M) treatment are gathered in Table 7 below.

TABLE 7

|  | Treatment without ultrasound | Treatment with ultrasound |
|---|---|---|
| Surface roughness (nm) | 6.6 | 6.3 |

Table 7 thus shows that the treatment for a mass/volume ratio equal to 5 for 1 h under ultrasonic waves gives the possibility of further reducing the surface roughness. The ultrasonic waves also give the possibility of obtaining better homogeneity of the chemical treatment on the surface roughness of Tyranno SA3 fibers.

The effect of the ultrasonic waves may be more or less visible depending on the treatment used. This effect is actually much more visible on the two other types of tested oxidizing treatments, which will be addressed later on.

The treatment may further be optimized by adding this time, the time factor coupled with the ultrasonic waves.

The results of the time-dependent change of the surface roughness versus the $Na_2CO_3$ (C=1M) treatment time with application of ultrasonic waves are gathered in Table 8 below.

TABLE 8

| Treatment time on 20 mg of fibers (mins) | 60 | 600 |
|---|---|---|
| Surface roughness (nm) | 6.3 | 5.4 |

Table 8 shows that the surface roughness of Tyranno SA3 fibers may be reduced if the treatment time of the fibers in an oxidizing solution of $Na_2CO_3$ (C=1M) is multiplied by 10 (600 mins versus 60 mins) for a mass/volume ratio equal to 5 with ultrasonic waves.

As a conclusion, the following parameters—mass of fibers to be treated, selection of the oxidizing solution, volume and concentration of the oxidizing solution, treatment time—may be optimized in order to reduce the surface roughness of a Tyranno SA3 fiber.

Thus, the efficiency range of a $Na_2CO_3$ treatment (C=1M) for a treatment duration of one hour is valid for a ratio R≤500, but this treatment will be also efficient if the treatment time is modified by a factor 10 for a ratio R≤5,000.

Figure 3A:
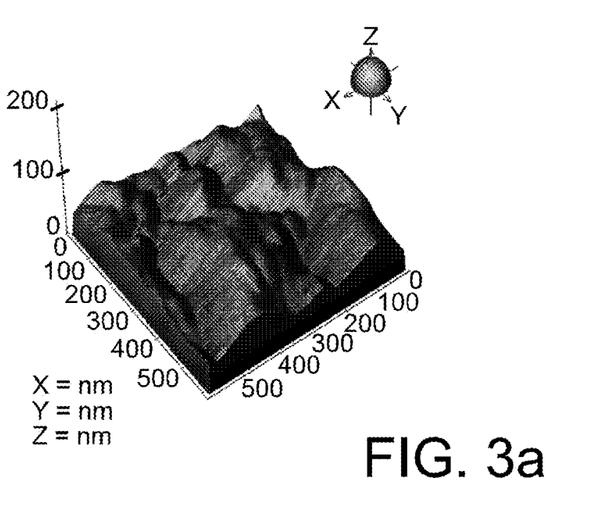
FIGS. 3a and 3b respectively illustrate an AFM image of the surface of a Tyranno SA3 fiber before (FIG. 3a) and after (FIG. 3b) being subject to a $Na_2CO_3$ treatment (C=1M) for 600 minutes and for a mass/volume ratio of 50 under ultrasonic waves according to a particular embodiment of the method according to the invention.
Figure 3B:
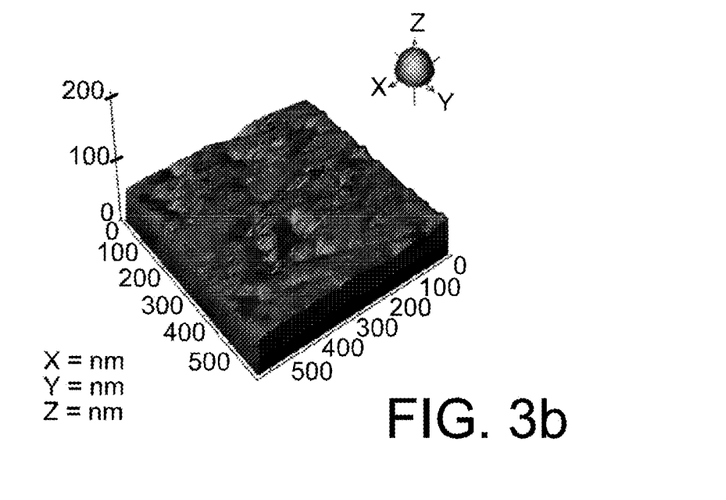

We carried out a $Na_2CO_3$ (C=1M) treatment with a ratio R=50 for 600 mins with ultrasonic waves on Tyranno SA3 fibers. FIGS. 3a and 3b are AFM images of a surface of a Tyranno SA3 fiber before (FIG. 3a) and after (FIG. 3b) such a $Na_2CO_3$ (C=1M) treatment. It is seen that with such a treatment, an optimum roughness of 4.3 nm is obtained.

Figure 4A:
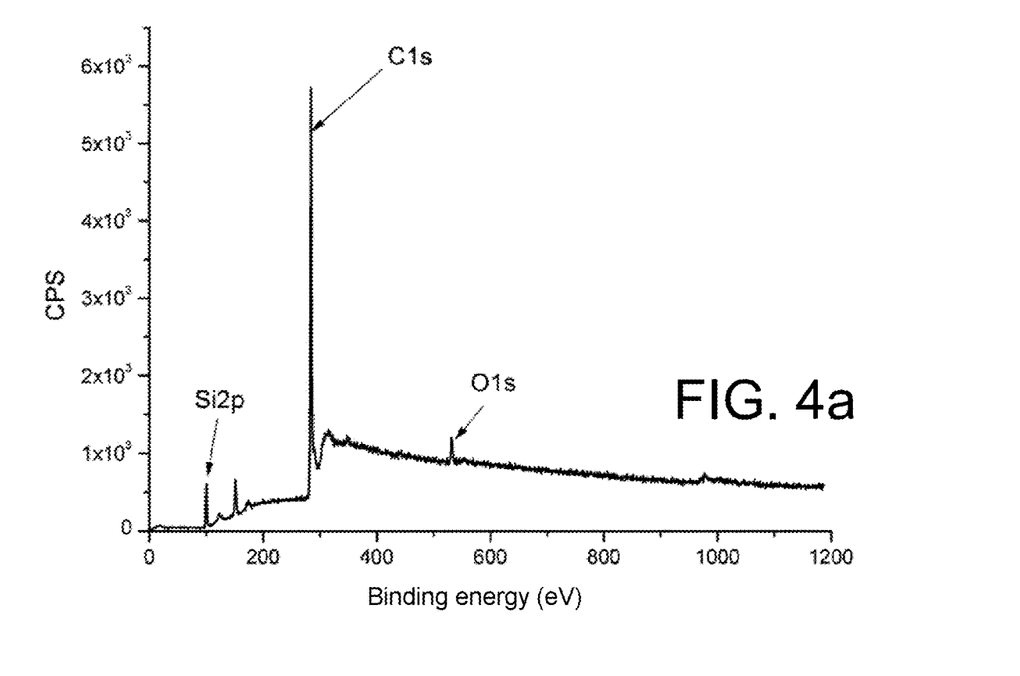
FIGS. 4a and 4b are graphs obtained by X-ray photoelectron spectroscopy (XPS), which show the chemical composition of the extreme surface of the Tyranno SA3 fiber before (FIG. 4a) and after (FIG. 4b) being subject to an $Na_2CO_3$ treatment (C=1M) for 600 minutes and for a ratio R=mass/volume of 50 under ultrasonic waves according to a particular embodiment of the method of the invention.
Figure 4B:
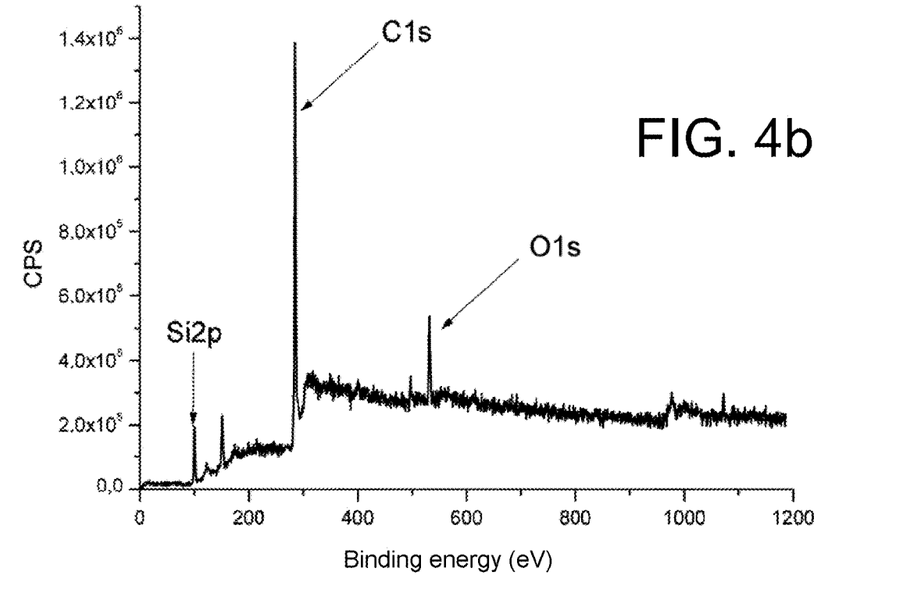

We performed a comparison of the chemical composition of the extreme surface with XPS of such a fiber before (FIG. 4a) and after (FIG. 4b) this $Na_2CO_3$ (C=1M) treatment.

We also performed a comparison of the chemical composition of the extreme surface of Tyranno SA3 fibers before treatment and after $Na_2CO_3$ treatment (C=1M). The results are gathered in Table 9 below.

TABLE 9

| Chemical elements present at the surface (atomic %) | C(1s) | O(1s) | Si(2p) |
|---|---|---|---|
| Untreated Tyranno SA3 fiber | 84.3 | 4.1 | 11.6 |
| Treated Tyranno SA3 fiber | 77.1 | 7.8 | 15.01 |

Figure 5A:
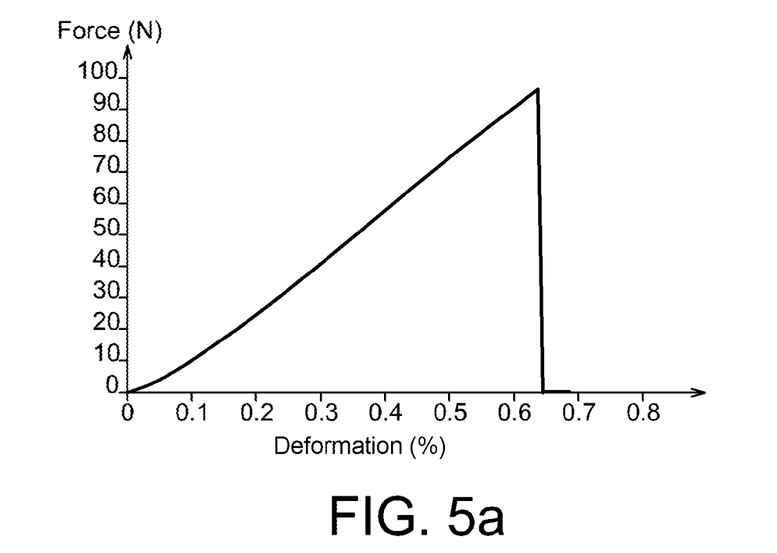
FIGS. 5a and 5b illustrate the mechanical tensile behavior of the Tyranno SA3 fiber before (FIG. 5a) and after (FIG. 5b) being subject to a $Na_2CO_3$ treatment (C=1M) for 600 minutes and for a mass/volume ratio of 50 under ultrasonic waves according to a particular embodiment of the method according to the invention.
Figure 5B:
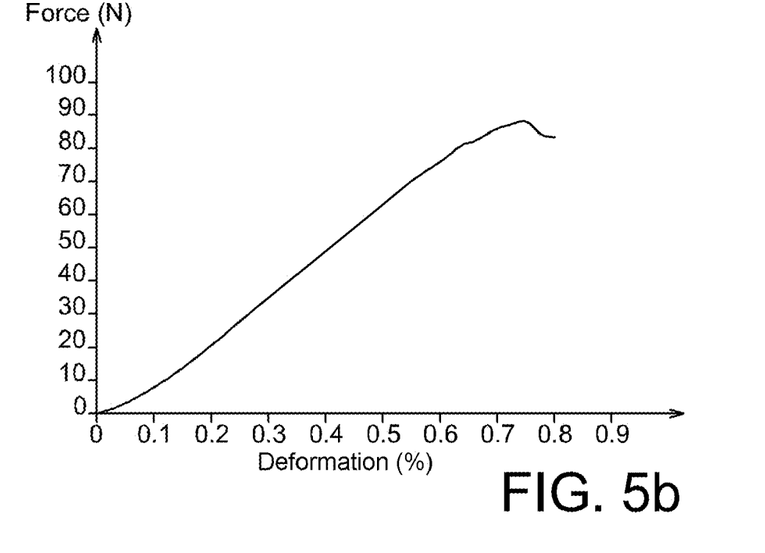

To finish, we performed a comparison of the mechanical behaviors of Tyranno SA3 fibers before treatment (FIG. 5a) and after $Na_2CO_3$ (C=1M) treatment (FIG. 5b).

By studying these results, it is seen that by carrying out a $Na_2CO_3$ (C=1M) treatment with R=50 for 600 mins under ultrasonic waves, an optimum roughness of 4.3 nm is obtained (FIG. 3b) without modifying the surface chemistry (Table 9 and FIG. 4b) and without deteriorating the chemical properties of the fibers (FIG. 5b).

The procedure explained above for defining the optimum conditions in the case of a chemical treatment by an oxidizing $Na_2CO_3$ (C=1M) solution may be adapted to other chemical treatments with oxidizing solutions such as hydrogen peroxide, nitric acid, chromic acid (chromium trioxide), calcium hypochlorite, sodium or potassium permanganate, carbamide peroxide, etc. . . . .

EXAMPLE 2

On the same principle as in Example 1 above, Tyranno SA3 fibers undergo a 15% $H_2O_2$ treatment for 60 mins.

It is thus seen that the efficiency range of a 15% $H_2O_2$ treatment for 60 mins is valid for a ratio R≤5,000.

This treatment is also efficient if the treatment time is multiplied by 10 for a ratio R≤50,000.

The optimum efficiency of this treatment is obtained for R=5 for 600 minutes under ultrasonic waves. The roughness which is then obtained is 3 nm.

EXAMPLE 3

On the same principle as in Example 1, Tyranno SA3 fibers are subject to a $HNO_3$ (65%) treatment for 180 mins.

It is seen that the $HNO_3$ (65%) treatment, as for it, is efficient for any R≤500 for 180 minutes.

This ratio may be multiplied by 10, when the treatment time is also modified by a factor 10.

The optimum treatment by using an $HNO_3$ (65%) solution is valid for a duration of 1,800 mins and allows a roughness of 5.3 nm to be obtained for a ratio R=50.

As a conclusion, it is seen that the oxidizing treatment gives the possibility of reducing the surface roughness of the Tyranno SA3 fiber to a level similar to that of the Hi-Nicalon S fiber without modifying the chemical properties of the extreme surface of this fiber (i.e. preserving a carbonaceous surface). Thus, it is possible to reduce the surface roughness of $3^{rd}$ generation silicon carbide fibers without modifying the chemistry of the extreme surface or even the mechanical properties of these fibers.

These thereby treated fibers allow elaboration of composites having strong tolerance to damaging with a non-fragile behavior. For example, the decrease in the surface roughness of Tyranno SA3 fibers allows optimization of the tolerance to deformation of SiC/SiC composites made with the thereby treated fibers.

Thus, by proceeding with the reduction in the surface roughness of $3^{rd}$ generation silicon carbide fibers, and in particular of $3^{rd}$ generation Tyranno SA3 fibers, it is possible to optimize the mechanical strength, and in particular the tolerance to deformation, of composites with a ceramic matrix made from such treated fibers, in particular SiC/SiC composites.

In order to validate the method according to the invention, two chemical treatments were carried out on 2.5D woven preforms (mass=4 g). Both of these treatments were carried out with hydrogen peroxide for a ratio R=5 for two different times.

The first treatment for a time $t_1$=900 minutes allows reduction in the roughness of the fibers to about 6 nm.

The second treatment for a time $t_2$=1,500 minutes allows reduction in the roughness of the fibers to about 4 nm.

Once these fabrics are treated, they were densified by CVI (Chemical Vapor Infiltration) with formation of the SiC matrix and of the interphase, located between the fibers and the matrix.

Finally, we compared the mechanical behavior of a 2.5D woven composite with crude Tyranno SA3 reinforcement fibers (roughness ~12 nm) (curve a), of a 2.5D woven composite with $H_2O_2$-treated Tyranno SA3 reinforcement fibers for R=5 during 900 minutes (roughness ~6 nm) (curve b) and of a 2.5D woven composite with $H_2O_2$-treated Tyranno SA3 reinforcement fibers for R=5 during 1,500 minutes (roughness ~4 nm) (curve c).

Figure 6:
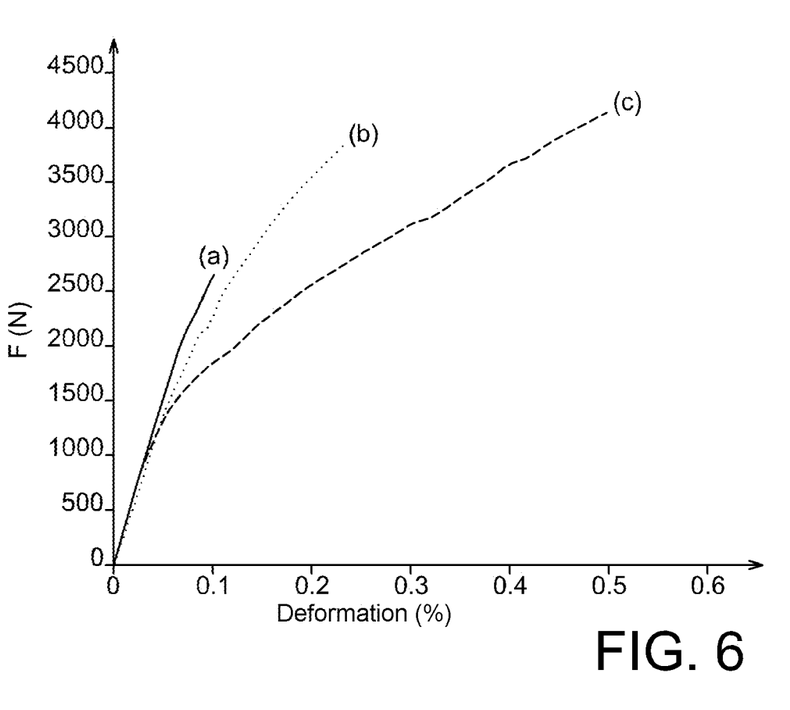
FIG. 6 illustrates the mechanical tensile behavior of an SiC/SiC composite of the 2.5D woven type with crude Tyranno SA3 reinforcements (curve a), with a Tyranno SA3 reinforcement treated with an $H_2O_2$ solution with a ratio R=5 for 900 minutes (curve b) and with a Tyranno SA3 reinforcement treated with an $H_2O_2$ solution with a ratio R=5 for 1,500 minutes (curve c).

The obtained results are shown in FIG. 6. An improvement in the deformation upon breakage of the SiC/SiC material made from chemically treated SiC fibers having the lowest roughness (curve c) is very clearly observed. The method according to the invention therefore actually gives the possibility of obtaining an SiC/SiC composite material having better tolerance to deformation.

BIBLIOGRAPHY

[1] C. Sauder et al.
  Influence of interface characteristics on the mechanical properties of Hi-Nicalon and SA3 fiber reinforced SiC/SiC minicomposites, *International Journal of Applied Ceramic Technology* (2010), 7(3), pages 291-303
[2] S. M. Dong et al.
  Characterization of nearly stoichiometric SiC ceramic fibers, *Journal of Materials Science* (2001), 36(10), pages 2371-2381

[3] C. Sauder et al.
Tensile creep behavior of SiC-based fibers with a low oxygen content, *Journal of the American Ceramic Society* (2007), 90(4), pages 1146-1156

[4] E. Buet et al.
Influence of chemical and physical properties of the last generation of silicon carbide fibers on the mechanical behavior of SiC/SiC composite, *Journal of the European Ceramic Society* (2012), 32(3), pages 547-557 (available on Internet in October 2011)

[5] C. Sauder et al.
Innovative SiC/SiC composites materials for fast reactor application, ANS 2010, San Diego, Jun. 17, 2010

The invention claimed is:

1. A method for improving the mechanical strength of a ceramic matrix composite material of the SiC/SiC type, this material being obtained by (a) forming a fiber preform from $3^{rd}$ generation silicon carbide fibers and (b) forming a ceramic matrix around the fiber preform, said ceramic matrix comprising silicon carbide, which method comprises a chemical etching treatment of the surface of the fibers by bringing said fibers in contact with a solution comprising an oxidizer, this treatment being carried out before step (a) or between steps (a) and (b).

2. The method according to claim 1, wherein the fibers before and after the chemical etching treatment include a carbon content which is larger at the periphery of the fibers than in the core of the fibers.

3. The method according to claim 1, wherein the bringing of the fibers into contact with the solution is obtained by immersion of the fibers in the solution.

4. The method according to claim 1, wherein the oxidizer is selected from carbonates of an alkaline or earth alkaline metal, peroxides, hypochlorites of an alkaline or earth alkaline metal, oxidizing acids and permanganates of an alkaline or earth alkaline metal.

5. The method according to claim 4, wherein the oxidizer is selected from nitric acid, chloric acid, chromic acid, sulfuric acid, calcium hypochlorite, magnesium hypochlorite, sodium hypochlorite, potassium hypochlorite, sodium permanganate, potassium permanganate, carbamide peroxide, hydrogen peroxide, potassium carbonate, sodium carbonate, calcium carbonate and magnesium carbonate.

6. The method according to claim 5, wherein the oxidizing solution is selected from a 15% by volume solution of hydrogen peroxide, a sodium carbonate solution of concentration 1 M and a 65% by volume solution of nitric acid.

7. The method according to claim 1, wherein the chemical etching treatment further comprises the application of ultrasonic waves to the solution comprising an oxidizer during the bringing of the fibers into contact with the solution.

8. The method according to claim 1, further comprising desizing of the silicon carbide fibers before the chemical etching treatment, this desizing step being carried out before step (a) or between the steps (a) and (b).

9. The method according to claim 1, wherein the silicon carbide fibers are fibers obtained by thermal decomposition and sintering of a Si—Al—C—O precursor.

10. The method according to claim 1, wherein the chemical etching treatment removes a sufficient amount of silicon carbide to decrease a surface roughness of the silicon carbide forming the $3^{rd}$ generation silicon carbide fibers from an original surface roughness of the $3^{rd}$ generation silicon carbide fibers that existed prior to the chemical etching treatment.

* * * * *